Aug. 17, 1965  A. B. CASTLE  3,201,161
LATCHES
Filed March 25, 1963  2 Sheets-Sheet 1
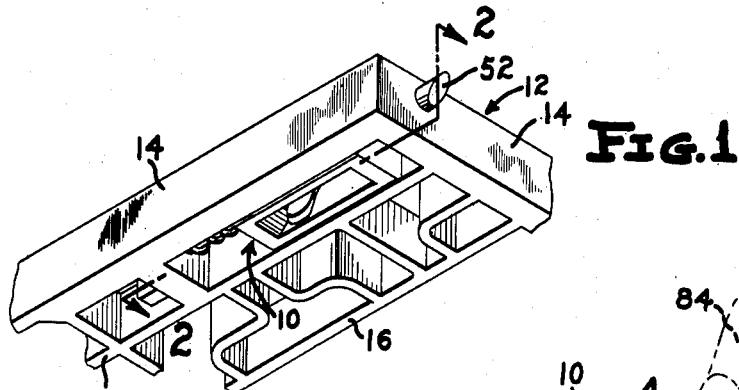
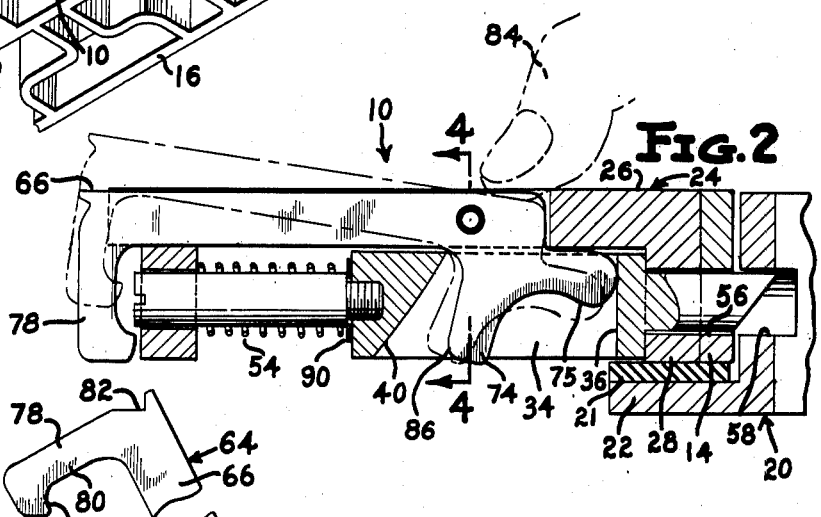
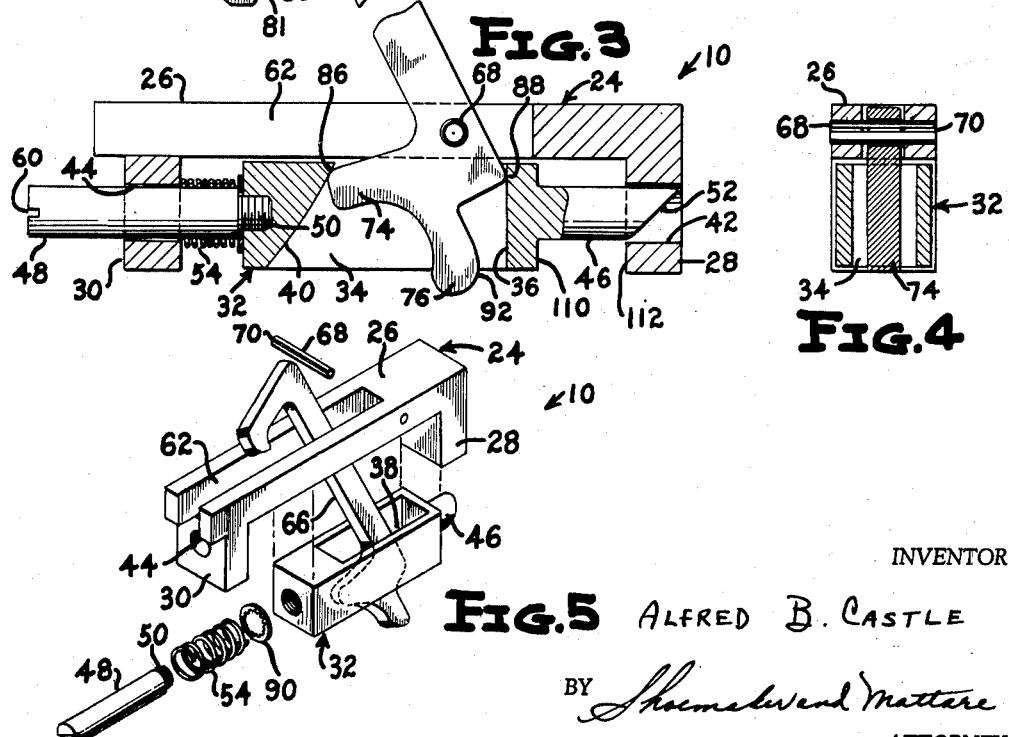
INVENTOR
ALFRED B. CASTLE
BY
ATTORNEYS

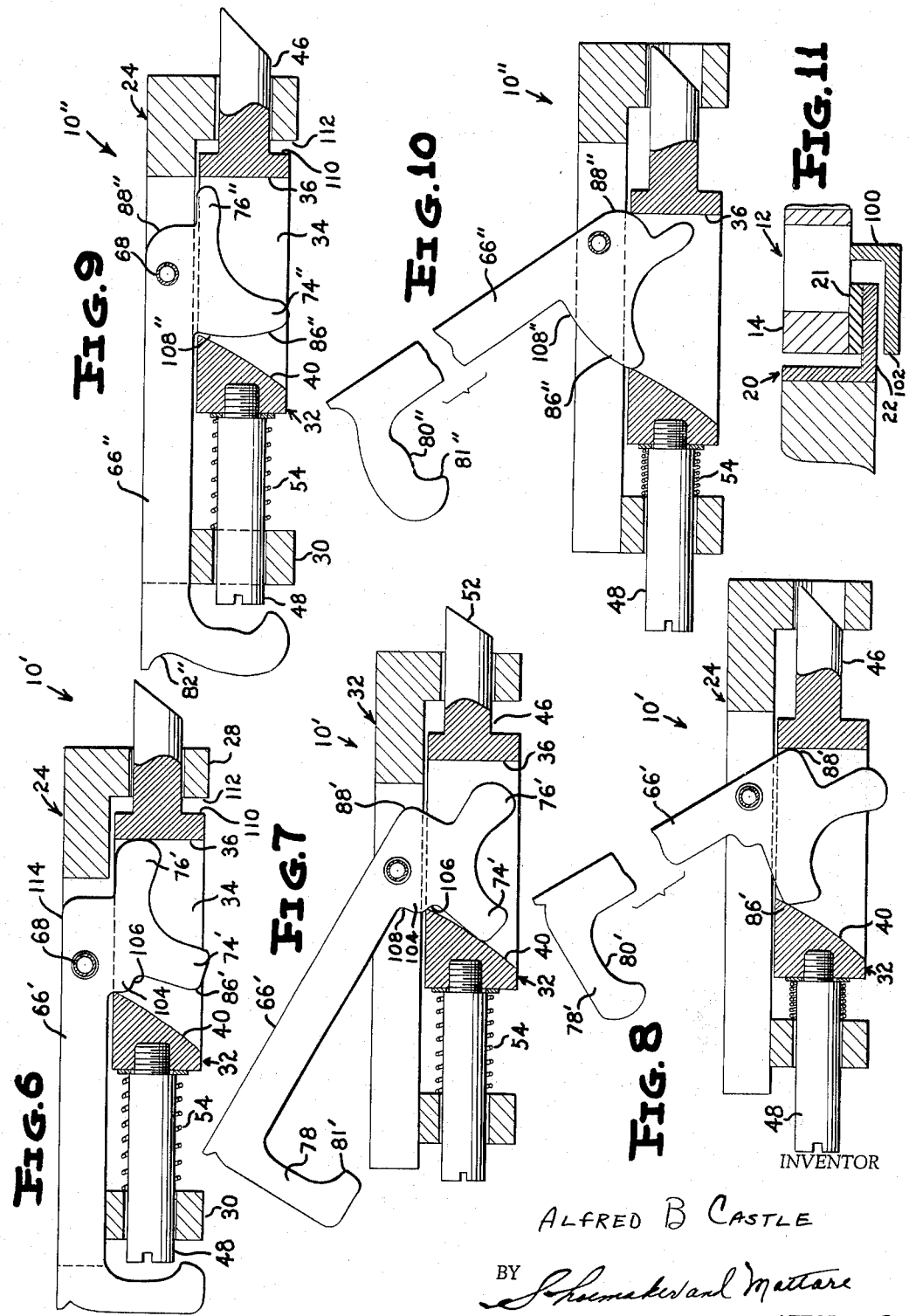

3,201,161
LATCHES
Alfred B. Castle, 4104 Maryland Drive, Brookmont, Md.
Filed Mar. 25, 1963, Ser. No. 267,497
6 Claims. (Cl. 292—173)

This invention relates to latches, and particularly to latches for securing gratings in a fixed position.

Briefly, the invention comprises new and novel latches that are adapted to be secured within a grating adjacent to one edge thereof so as to releasably secure the grating to a fixed frame. The latches each include a spring operated bolt that is normally urged by the spring into a recess of a fixed grating support frame. A lever is permanently pivotally mounted within the latch frame so as to normally lie flush within the frame and the grating to which the latch is secured. However, when the lever is manually pivoted upwardly, the bolt is retracted against its spring means whereby the lever may be used as a handle for lifting the grating from its support frame.

Accordingly, it is a primary object of this invention to provide new and novel latches for removably securing gratings in a fixed position, and the latches are particularly adapted for securing manhole covers in position and for securing gratings in position on the decks of aircraft carriers.

It is another object of this invention to provide latches for gratings which have built in operating handles which normally lie flush with the grating on which the latches are attached, but the handles are so designed that when they are pivoted upwardly, they not only release the latches so that the gratings may be removed, but also the levers are provided with handle means for lifting the gratings after they are unlatched.

It is another object of this invention to provide latches which have operating levers that are pivotally mounted so that they are automatically urged by gravity to an inoperative and flush position when the levers are released.

It is yet another object of the invention to provide latches which have built in operating handles that are so designed that they are substantially concealed and it is not obvious to one unfamiliar with the latches how they could be operated to a released position.

It is another object of the invention to provide latches having guide pins for their bolts whereby the guide pin also functions as an indicator for visually indicating whether or not the bolts of the latches are in latched or unlatched position.

It is yet another object of the invention to provide a latch having a built in operating lever whereby the lever is so designed and pivotally mounted so that the lever may be pivoted from a recess in the latch by manually depressing one end of the lever so that the other end of the lever projects upwardly so that it may be manually grabbed for operating the latch to an unlocking or unlatched position.

It is yet another object of the invention to provide latches for gratings each of which not only may be operated from the top of the grating but also may be operated from below the grating so as to prevent people from being inadvertantly trapped below the grating on which the latch is used.

It is still yet another object of the invention to provide latches each of which has a pivotally mounted operating handle with a hand grip formed thereon so that the hand grip functions to lock the bolt of the latch in a latching position when the lever in in its normal retracted inoperative position thereby preventing the bolt from inadvertantly being moved to an unlatching position when subject to shock, explosions, or other forces tending to move the bolt.

It is still yet another object of the invention to provide latches each of which is of relatively simple design, economical to manufacture, durable in use, and requires a minimum of maintenance.

It is still yet another object of the invention to provide new and novel latches each of which are foul proof and cannot be clogged by dirt or other foreign material.

It is still another object of the invention to provide latches which are practically pick-proof and thereby eliminates tampering.

It is still another object of the invention to provide novel latches each of which have a pivoted operating handle that cannot be pushed down to a flush and inoperative position until the bolt of the latch is in the latching position, and when the operating lever is pushed down, it has camming means thereon which positively force the latch bolt to a locking position if the bolt has not already been moved to a latching position by the spring of the latch.

It is yet another object of the invention to provide latches each of which may be used in gratings and have substantially smooth surfaces that lie flush with the upper surfaces of the gratings on which it is used thereby eliminating the possibility of one catching or snagging his or her heels in the latch or grating.

It is another object of the invention to provide latches which may be used in gratings and manhole covers so as to lie flush with the upper surface thereof when in the latching position so as to eliminate any projections which could trip a person.

It is another object of the invention to provide latches which have novel cam operating means and other means whereby the operating levers of the latches may be easily moved upwardly so that they may be properly gripped before the levers are used for forcing the latches to open position.

It is yet another object of the invention to provide a latch having a novel cam detent for holding the operating lever of the latch in a partially elevated position whereby the lever may be easily gripped whenever desired for forcing the latch to an open or unlatching position. When the grate or manhole cover on which the latch is used is dropped into position on its supporting frame, the cam detent automatically releases and the lever falls by gravity to its inoperaive and flush position.

It is still yet another object of this invention to provide latches each of which is provided with spring means for operating the bolt of the latch and which spring means normally holds the moving parts of the latch into snug abutting relationship so as to prevent rattling.

It is still yet another object of the invention to provide a latch comprising a frame, a bolt, and an operating lever wherein the frame and bolt are so designed that they may be used with a plurality of operating levers of different designs so as to produce different operating characteristics of the latch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating one form of the novel latch mounted within one corner of a conventional grate or grating;

FIG. 2 is an enlarged vertical cross sectional view taken substantially on the plane of line 2—2 of FIG. 1;

FIG. 3 is a view similar to FIG. 2 but showing portions of the latch in an unlatching position;

FIG. 4 is a vertical cross sectional view taken substantially on the plane of line 4—4 of FIG. 2;

FIG. 5 is an exploded perspective view of the latch shown in FIG. 1;

FIG. 6 is a view similar to FIG. 2 but showing a modified form of the latch;

FIG. 7 is a view of the modified form similar to FIG. 6 but showing the operating lever of the latch in a partially elevated position;

FIG. 8 is a view similar to FIG. 7 but showing the operating lever in the fully elevated position so as to force the bolt of the latch to an unlatching position;

FIG. 9 is a view similar to FIG. 6 but showing a second modified form of the invention;

FIG. 10 is a view similar to FIG. 9 but showing the second modified form of the latch in the fully opened or unlatching position;

FIG. 11 is a vertical cross sectional view taken through the rear edge of a grating and its support frame.

As shown in FIGS. 1 through 5 of the drawings, the latch 10 of this invention may be mounted within a conventional grating 12 which includes a rectangular peripheral frame 14 having spaced parallel plates 16 extending thereacross. The plates 16 are connected by transversely extending integral webs 18 of various configurations. The latch 10 may be mounted within any suitable space defined by frame 14, plates 16, and webs 18.

As illustrated in FIG. 1, the latch 10 is mounted between one of the plates 16 and the frame 14.

As illustrated in FIG. 2, the grate 12 is adapted to be received within and supported on a fixed stationary frame 20 which may be secured to a sidewalk, the paving of a street, the deck of an aircraft carrier, etc. The frame 20 preferably is composed of angle members having a flange or seat 22 which extends under and supports the frame 14 of the grate 12. A resilient pad 21 may extend between flange 22 and frame 14.

The latch 10 includes an inverted U-shaped frame 24 comprising a rectangular base plate 26 having a pair of legs 28 and 30 integrally secured to opposite ends thereof and extending downwardly therefrom in parallel relationship.

A rectangular box-like bolt base 32 is mounted between the legs 30 and 28, but is of a length substantially less than the distance between the legs. The bolt base 32 is provided with a vertically extending recess or passage 34 which preferably extends completely therethrough. The recess 34 is defined by a vertically extending front wall 36, a pair of parallel vertically extending side walls 38 and a canted convex rear wall 40 which forms a curved cam surface that slopes downwardly and rearwardly towards the leg 30.

The legs 30 and 28 are provided with coaxial bores 42 which slidably receive bolt 46 and guide pin 48. Pin 48 is provided with an end of reduced diameter provided with threads 50 which are threaded into a bore in the rear of base 32. A shakeproof washer 90 is clamped between a radial shoulder on pin 48 and the rear of base 32. Bolt 46 is provided with a cam surface 52 on its forward end and the rear end thereof is integrally secured to the base 32. A coil spring 54 telescopically receives the pin 48 and is compressed between the leg 30 and washer 90 so as to urge the base 32 into engagement with leg 28 as shown in FIG. 2, so that bolt 46 projects through bore 56 in frame 14 and into latching chamber or recess 58 formed in the support frame 20. The rear end of pin 48 is provided with a diametrical slot 60 for the reception of a screwdriver or other suitable tool so that the pin may be rotated and unscrewed from the bolt base 32.

The base plate 26 is provided with a rectangular slot 62 which extends longitudinally through the center thereof. An operator 64 comprising a lever 66 is mounted within the slot 62 and the forward end of the lever 66 is pivotally connected to the U-shaped frame 24 by means of a pivot pin 68 which extends through aligned bores in the lever and base plate. Pin 68 comprises a resilient sheet of metal rolled into a substantially cylindrical shape but having opposite edges thereof spaced from one another so as to provide a longitudinal slot 70. The pin 68 is normally larger than the bores in the base plate 26 so that when the pin is inserted into these bores it is slightly compressed and held in position by friction. The bore through the lever 66 which receives the pin 68 is slightly larger than the bores in the base plate 26 so that the lever may freely rotate or pivot on the pivot pin 68. The forward end of lever 66 is integrally secured to a camming lug or projection 74 which extends downwardly into the recess 34. A stop lug 76 is integrally secured to lug 74 and projects forwardly therefrom closely adjacent the front wall 36 of recess 34 as shown in FIG. 2.

The rear end of lever 66 is provided with an integral downwardly extending hand grip 78 which has an arcuate forward edge 80 normally extending around the rear end of the pin 48 as shown in FIG. 2. The rear end of the lever may also be provided with a notch 82 for gripping the rear end of the lever and lifting it upwardly. However, the lever is normally forced from its horizontal position by other means described below.

Normally, the spring 54 urges the base 32 and bolt 46 forwardly to the latching position as illustrated in FIG. 2, wherein the forward end of base 32 abuts the leg or bolt guide 28. Since the center of gravity of the lever 66 is rearwardly of the pivot pin 68, the lever is urged by gravity downwardly into the slot 62 so that the top of the lever lies generally parallel to and flush with the upper surface of the frame 24. In this position of the lever, the stop lug 76 is in engagement with or directed adjacent the front wall 36 thereby locking the bolt in latching position so that the bolt cannot be forced to an unlatching position by unauthorized personnel. If the bolt 46 and bolt base 32 are forced rearwardly towards the unlatching position, the front wall 36 contacts the stop lug 76 and tends to rotate lever 66 in a clockwise position as illustrated in FIG. 2. However, when the bolt and bolt base are forced rearwardly, the guide pin 48 is forced to move within the confines of the concave recess or edge 80 thereby causing the projecting tip 81 of hand grip 78 to contact guide pin 48 and thereby positively preventing lever 66 from moving upwardly. Thus, the lever and its stop lug 76 positively prevent bolt 46 from being forced to an unlatching position. It is to be noted, that one not familiar with the principle of operation of the above described latch 10 would not know how to operate the lever 66 so as to withdraw bolt 46 to the unlatching position illustrated in FIG. 3.

When the latch is in latching position as illustrated in FIG. 2, the rear end of the pin 48 is substantially flush with the rear surface of the leg or pin guide 30. Thus, the pin 48 serves as a visual indicator which indicates whether or not the bolt 46 is in latching position or not. Also, if the bolt 46 is not in latching position, the handle or lever 66 may be forced downwardly whereupon the lug 76 moves upwardly into engagement with the front wall 36 and positively cams the bolt forwardly into latching position.

To operate the latch 10 to the unlatching position illustrated in FIG. 3, it is only necessary that the operator take one finger or thumb of one hand as indicated at 84 in FIG. 2 and press down the forward end of lever 66 so that the lever moves in a clockwise direction to the dotted line position as shown in FIG. 2. The operator can then grasp the rear end of lever 66 with the remaining fingers of the same hand which is used to push down the lever. Notch 82 may facilitate the grasping of the lever. The lever is then moved upwardly as illustrated in FIG. 3, and as the lever pivots upwardly, the arcuate corner or cam surface 86 on lug 74 slides along the convex cam surface 40 and cams the base 32 and bolt 46 to the retracted position illustrated in FIG. 3. Once the lever is moved substantially 60° to the vertical, the forward end of the lever at point 88 and the cam surface 86 become wedged between the walls 40 and 36 so that the lever cannot be further pivoted in a clockwise direction as viewed in FIG. 3. Thus, the surfaces 86 and 88 of the lever reacting against surfaces 36 and 40 on the bolt base serve as a limit stop for the lever. Thereafter, lever 66 and its handgrip 78 may be used as a handle to lift grate 12 from frame 20.

If some one should inadvertently become locked below the grill or grating 12, he may release himself by unlocking the latch 10. This may be accomplished either by pushing upwardly on the bottom end of hand grip 78 or by pivoting lug 74 upwardly and forcing bolt base 32 rearwardly.

As illustrated in FIG. 5, the entire latch assembly may be disassembled in an obvious manner merely by unscrewing and removing the pins 48 and 68.

The latch 10 may be welded or attached by other conventional means to the grate 12.

The stop lug 76 has a cam surface 92 formed thereon which may be engaged with the front wall 36 when the bolt is in the retracted position shown in FIG. 3 whereupon by pressing the lever 66 downwardly, the cam surface 92 engages the wall 36 and forces the bolt 46 into the latching chamber 58. Although the spring 54 will normally urge the bolt to latching position, if the chamber 58 is slightly out of alignment with the bolt or if the bolt becomes corroded, it may be necessary to force the bolt by means of handle 66 into latching position.

Although as many latches 10 as desired may be used on one grate, it is only necessary that one latch be used since the opposite side of the grate from that on which the latch is attached, may be secured by fixed pins on the grate extending into recesses in the frame 20. Pin 68 may be replaced by a pin or rivet welded into position to prevent disassembly of the latch.

A small grate would normally employ only one of the latches 10 which would be located at the center of one edge of the grate. A larger grate could have two of the latches 10 arranged in parallel spaced relationship adjacent one edge of the grate. FIG. 1 illustrates this specific arrangement although it only shows one of the latches.

FIG. 11 illustrates how the edge of the grate 12 that is parallel to and opposite to the edge containing the latches is supported on and secured to the support frame 20. Like the front edge 14 of the grate, the rear edge 14 is also supported on the resilient pad 21 and flange 22. An angle member 100 is secured to the rear portion of the grate 12 and has a horizontally extending flange 102 projecting beneath the flange 22 in parallel spaced relationship thereto so as to normally prevent the rear edge of the grate from being lifted. However, once the latches 10 have been released, the grate may be lifted so that it pivots about the rear edge 14 thereof and after the front edge of the grate has been slightly lifted, the entire grate may be moved forwardly so that the flange 102 moves away from the flange 22 whereupon the entire flange may then be lifted away from support frame 20.

By having the cam surface 40 of convex shape as illustrated in FIGS. 2 and 3, when the lever 66 is initially elevated so that cam surface 86 begins to slide along cam surface 40, the bolt 46 is moved rearwardly towards an unlatching position at a relatively fast rate. However, as the lug 74 approaches a horizontal position, it contacts the upper portion of the cam surface 40 which is more nearly vertical and thereby increases the mechanical advantage of the lever so that the spring 54 may be more easily compressed. It is to be noted, that as the spring 54 is compressed, its resistance to compression gradually increases. Therefore, the particular shape of the cam surface 40 is important because by increasing the mechanical advantage of the lever 66 near the end of its stroke when the spring 54 is almost fully compressed, the lever may be more easily operated.

The latch 10' illustrated in FIGS. 6 through 8 is identical to the latch 10 shown in FIGS. 1 through 5 except the lever 66' is of a different design to produce different operating characteristics. At the upper rear edge of the lug 74' there is provided a detent 104 having a rearwardly facing convex cam surface which forms with the lug 74 a recess 106. The upper portion of the detent 104 also provides an abutment surface 108. The bore in the lever 66' is further located rearwardly than the bore in the lever 66 for the pin 68 whereby when the lever 66' is in the horizontal or flush position, the upper edge of the cam surface 40 contacts the abutment surface 108 and thereby maintains the forward surface 110 of the bolt base 32 spaced from the rear surface 112 of leg 28 as illustrated in FIG. 6. Spring 54 thereby urges the upper corner of cam surface 40 into engagement with the abutment surface 108 so as to maintain the bolt base 32 constantly in snug engagement with lever 66' and maintain the base 32 spaced from leg 28 so as to hold the lever 66' in a flush position and prevent rattling of the lever, base 32 and frame 24.

By pressing the forward end 114 of lever 66' downwardly as viewed in FIG. 6, the lever may be easily pivoted approximately 30° in a clockwise direction to the position illustrated in FIG. 7 whereupon the upper corner of cam surface 40 projects into recess 106. The spring 54 urges bolt base 32 forwardly and thereby maintains the upper corner of cam surface 40 within the recess 106 so as to maintain the lever 66' in the position illustrated in FIG. 7. By having the lever 66' maintained in a partially elevated position as illustrated in FIG. 7, the lever then may be easily grabbed or grasped whereupon the lever may be further elevated to the position illustrated in FIG. 8. As the lever moves from the FIG. 7 position to the FIG. 8 position, the cam surface 86' rides upwardly along the cam surface 40 thereby camming the bolt base 32 and bolt 46 to the retracted position illustrated in FIG. 8. When the bolt is fully retracted as illustrated in FIG. 8, the surfaces 88' and 86' become wedged between the surfaces 40 and 36 to prevent further upward movement of the lever 66' whereupon the lever and its hand grip 78' may be used for lifting the latch 10' and the grate secured thereto upwardly.

If the lever 66' is in the FIG. 7 position and the grate to which it is attached is dropped onto the support frame 20, the cam surface 52 contacts the support frame and forces the bolt base 32 inwardly whereupon the upper corner of cam surface 40 is moved out of recess 106 thereby permitting the lever 56' to drop by gravity to the horizontal or flush position illustrated in FIG. 6. Of course, once the grate becomes seated on its support frame, spring 54 forces bolt 46 into the latching position as illustrated in FIG. 2.

The latch 10'' illustrated in FIGS. 9 and 10 is also the same as the latches 10 and 10' except the operating lever 66'' is of a different shape so as to produce different operating characteristics. The rear surface of the lug 74'' is of convex shape so as to provide an arcuate cam surface 86''. The upper end of the cam surface 86'' terminates in an abutment surface 108'' which is substantially perpendicular to the longitudinal axis of lever 66''. The bore in the lever 66'' for the pivot pin 68 is located more forwardly of the lever 66'' than in the lever 66 whereupon spring 54 urges the upper corner of cam surface 40 into engagement with the abutment surface 108' before the surface 110 contacts the surface 112 to prevent rattling between the bolt base 32 and frame 24. Also, when the upper corner of cam surface 40 is urged by spring 54 into engagement with abutment surface 10'', the lever 66'' is held downwardly into snug engagement with frame 24 so as to prevent rattling of the lever. By having both of the cam surfaces 40 and 86'' of convex shape, the mechanical advantage of the lever 66'' is increased at a more rapid rate as the lever is elevated thereby permitting the latch to be operated to the released or unlatching position more easily. This also permits the spring 54 to be replaced by a stronger spring if desired.

It is also to be noted that the notch 82″ in the rear of lever 66″ is larger thereby providing a better grip to permit the lever to be initially moved upwardly more easily.

As illustrated in FIG. 10, when the lever 66″ is moved upwardly so as to fully retract the bolt 46, the arcuate nose 88″ contacts the upper corner of front wall 36 thereby positively stopping upward pivotal movement of the lever 66″ whereupon the lever may be used as a handle for lifting latch 10″ and the grate secured thereto. When the lever 66″ is fully withdrawn as illustrated in FIG. 10, spring 54 cams the lever to the flush or normal position illustrated in FIG. 9 when the lever is released.

It is to be noted that like the latch 10, when the bolt 46 of the latches 10′ and 10″ are forced rearwardly, the guide pins 48 move into the recesses defined by the edges 80′ and 80″ thereby causing the points 81′ and 81″ to contact the rear ends of the guide pins so as to prevent the levers 66′ and 66″ from pivoting upwardly whereby the stop lugs 76′ and 76″ contact the surfaces 36 so as to positively prevent the bolts 46 from being pried or forced to the unlatched position.

Inasmuch as various changes may be made in the form, location and relative arrangement of the several parts without departing from the essential characteristics of the invention, it will be understood that the invention is not to be limited except by the scope of the appended claims.

I claim:
1. A latch comprising a base plate, a bolt having a slot therein mounted on said base plate for sliding movement relative thereto, a first end wall of said slot having a cam surface, and a second end wall of said slot spaced from said first end wall, urging means cooperating between said bolt and base plate for normally maintaining said bolt in a catch engaging position, said base plate having an opening therein aligned with the slot of the bolt, a lever comprising a projection, a pin located in said opening spaced from one end thereof pivotally mounting said lever in said base plate, said lever in a first position having a surface substantially flush with a surface of the base plate, said projection on said lever having a surface adapted to engage the cam surface of the first end wall of said bolt slot and retract said bolt from its catch engaging position when the lever is pivoted from its first position to a second position, said lever having a portion with a linear dimension greater than the least dimension between said spaced end walls, said portion on pivoting of said lever to the second position engaging said end walls and limiting further pivotal movement of said lever.

2. The latch of claim 1 further characterized in that said lever has a second projection thereon engageable with the said second end wall of slot when said bolt is spaced from its catch engaging position for camming the bolt to its catch engaging position.

3. The latch of claim 1 further characterized in that said lever has another projection thereon spaced from the first projection and lying in the path of movement of said bolt when said lever is in its first position.

4. The latch of claim 1 further characterized in that the center of mass of said lever is on that side of the pivot pin opposite to the said projection.

5. The latch of claim 1 further characterized in that surface means are provided on one of said projections and said first end wall, for maintaining said lever in a raised pivoted position intermediate said first position and second position.

6. The latch of claim 5 wherein said bolt is in a catch engaging position when said lever is in said intermediate position.

References Cited by the Examiner
UNITED STATES PATENTS

| | | | |
|---|---|---|---|
| 691,180 | 1/02 | Rogers | 292—173 |
| 2,293,645 | 8/42 | Falk | 292—165 |
| 2,649,322 | 8/53 | Mack | 292—173 |
| 2,969,999 | 1/61 | Herman | 292—173 |
| 3,130,996 | 4/64 | Moxness et al. | 292—173 |

M. HENSON WOOD, JR., *Primary Examiner.*
ALBERT H. KAMPE, *Examiner.*